United States Patent [19]

Shimada

[11] 4,355,523
[45] Oct. 26, 1982

[54] AUTOMATIC CAR-COOLER CLUTCH CONTROL APPARATUS

[75] Inventor: Yukio Shimada, Yokohama, Japan

[73] Assignee: Nissan Motor Company, Ltd., Yokohama, Japan

[21] Appl. No.: 215,826

[22] Filed: Dec. 12, 1980

[30] Foreign Application Priority Data

Dec. 18, 1979 [JP] Japan .................. 54-163467

[51] Int. Cl.³ .................. B60H 3/04; F25B 27/00
[52] U.S. Cl. .................. 62/133; 62/230; 62/323.4
[58] Field of Search .......... 62/230, 243, 133, 323.1, 62/323.4

[56] References Cited

U.S. PATENT DOCUMENTS 3,606,764  9/1971  Yokouchi et al. .......... 62/323.1
4,135,368  1/1979  Mohr et al. .................. 62/133
4,226,090 10/1980  Horian ...................... 62/323.4

FOREIGN PATENT DOCUMENTS 376730  7/1932  United Kingdom .
688232  3/1953  United Kingdom .
963261  7/1964  United Kingdom .

Primary Examiner—Albert J. Makay
Assistant Examiner—Harry Tanner
Attorney, Agent, or Firm—Schwartz, Jeffery, Schwaab, Mack, Blumenthal & Koch

[57] ABSTRACT

An automatic car-cooler clutch control apparatus such that the compressor can forcedly be engaged with the engine when a predetermined period of time has elapsed after the compressor is disengaged or when the vehicle speed reaches a predetermined value, in addition to when a vacuum pressure within the intake manifold is more than a predetermined value, that is, a relatively light load is applied to the engine. The automatic car-cooler clutch control apparatus of the present invention comprises a timer or a speed indicator including one or two switch circuits for energizing the clutch relay to engage the compressor with the engine, regardless of a vacuum pressure within the intake manifold, in addition to a vacuum pressure switch and a vacuum pressure chamber communicated with the intake manifold.

1 Claim, 4 Drawing Figures

AUTOMATIC CAR-COOLER CLUTCH CONTROL APPARATUS

BACKGROUND OF THE INVENTION

1. Field of the Invention

The present invention relates generally to an automatic car-cooler clutch control apparatus used with an automotive vehicle, and more particularly to a compressor clutch control apparatus in which a timer or a speed indicator is provided for engaging the compressor with the engine when a predetermined period of time has elapsed after the compressor is disengaged or when the vehicle reaches a predetermined speed, in addition to a conventional vacuum switch actuated by a vacuum chamber communicating with the intake manifold so that the compressor can be disengaged when a heavy load is applied to the engine.

2. Description of the Prior Art

Generally, even a small engine has sufficient engine output to operate the car cooler compressor when the engine is operating under a relatively light load; however, the compressor load sometimes deteriorates the engine is operated under a heavy load such as when the engine is accelerated, or is operated at a high speed or at a low speed under a heavy load (as when the vehicle goes up a slope). Therefore, there has been proposed an automatic car-cooler clutch control device to disengage the car-cooler compressor from the engine only when a heavy load is applied to the engine.

In a conventional car-cooler clutch control device, as described in more detail hereinafter with reference to one of the accompanying drawings, whenever the engine is operated at a high speed or at a low speed under a heavy load for a long time, there has been a shortcoming such that the car-cooler cannot be operated for a long period of time even if the temperature within the passenger compartment rises uncomfortably high. Further, in the conventional car-cooler clutch control device, it is impossible to cool the passenger compartment freely after the vehicle has been left in the sun or when the engine is being idled, accelerated, or operated at a high speed. This is because the vacuum pressure within the intake manifold is low and therefore the car cooler clutch is forcedly disengaged from the engine even if the manual switch for the cooler is kept turned on.

SUMMARY OF THE INVENTION

With these problems in mind therefore, it is the primary object of the present invention to provide an automatic car-cooler clutch control apparatus such that the car-cooler is operated when a predetermined period of time has elapsed after the compressor is turned off or when the vehicle reaches a predetermined speed, regardless of the condition of the vacuum pressure within the intake manifold.

To achieve the above-mentioned object, the automatic car-cooler clutch control apparatus of the present invention comprises a timer controlled switch to engage the clutch with the engine a fixed period after being turned off or a speed indicator to engage the clutch with the engine when the vehicle speed exceeds a predetermined value, in addition to a conventional vacuum switch actuated by a vacuum chamber.

BRIEF DESCRIPTION OF THE DRAWINGS

The features and advantages of an automatic car-cooler clutch control apparatus according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Figure 1:
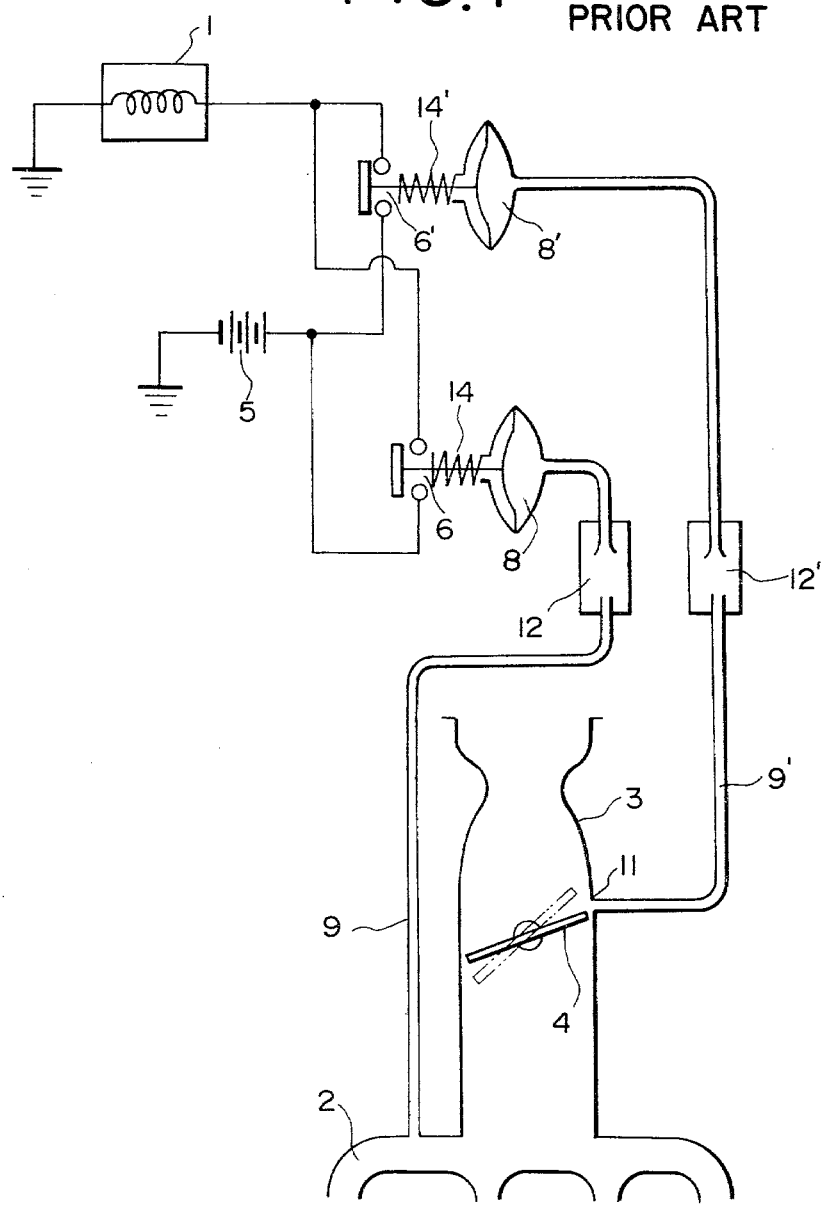
FIG. 1 is a schematic wiring diagram of a conventional automatic car-cooler clutch control device.

To facilitate understanding of the present invention, a brief reference will be made to a prior-art automatic car-cooler clutch control device. Referring to FIG. 1, a conventional car-cooler clutch control device comprises an electromagnetic clutch coil 1 to engage or disengage a compressor with the engine, a first vacuum pressure switch 6 actuated by the vacuum pressure developed within the intake manifold 2 and a second vacuum pressure switch 6' actuated by the vacuum pressure developed within the carburetor 3 in connection with a throttle valve 4.

To explain in more detail, the first and second normally-open vacuum pressure switches 6 and 6' are provided, in parallel with each other, between the electromagnetic clutch coil 1 for engaging the car-cooler compressor (not shown) with the engine and a battery 5. A first vacuum pressure chamber 8 to actuate the first vacuum pressure switch 6 communicates with the engine intake manifold 2 through a pipe 9 with a vacuum pressure damper 12 connected therebetween; a second vacuum pressure chamber 8' to actuate the second vacuum pressure switch 6' communicates with a vacuum inlet port 11 located near the throttle valve 4 of the carburetor 3 through another pipe 9' with a vacuum pressure damper 12' connected therebetween.

Although normally kept open by the action of a spring 14, the first vacuum pressure switch 6 is closed by the diaphragm movement of the first vacuum pressure chamber 8 against a spring 14 when a vacuum pressure within the intake manifold 2 becomes greater than that developed in engine idling (since the vacuum pressure becomes higher when the engine is operated at speed under a light load), for instance, 600 mmHg in vacuum pressure (or less than −600 mmHg in gage pressure).

In the same way, the second vacuum pressure switch 6' is closed by the diaphragm movement of the second vacuum pressure chamber 8' against a spring 14' when a vacuum pressure within the vacuum inlet portion 11 is greater than a predetermined value, for instance, about 50 mmHg in vacuum pressure (or smaller than −50 mmHg in gage pressure).

In the conventional automatic car-cooler clutch control device described above, the clutch coil 1 is energized to operate the car-cooler compressor by either of the two vacuum pressure switches 8 and 8' when the accelerator pedal is slowly depressed or when it is kept at an intermediate position in order to run the vehicle at a medium or high constant vehicle speed, because the vacuum pressure is relatively large due to a light load on the engine; however, the clutch coil 1 is not energized in other cases such as when the engine is being idled or when the accelerator pedal is suddenly depressed or fully depressed, because the vacuum pressure is relatively small due to a heavy load on the engine. Moreover, it takes some time for either of the vacuum pressure switches 6 and 6' to be actuated when the engine is operating at a constant medium or high speed even though the accelerator pedal is not being depressed fully or suddenly.

Therefore, in the case when the vehicle goes up a slope for a long time, the car-cooler is not operated because the accelerator pedal is almost fully depressed and therefore the vacuum pressures at the two positions are insufficient to actuate the vacuum pressure chambers 8 and 8'.

For the same reason as described above, in the case when the vehicle is driven at a high speed for a long time, the cooler is not operated.

In addition, in the case where there is an urgent need for quick cooling of the passenger compartment, as for example when the car has been left in the sun, it is impossible to operate the cooler with the engine idling, accelerating, or running at high speed.

Figure 2:
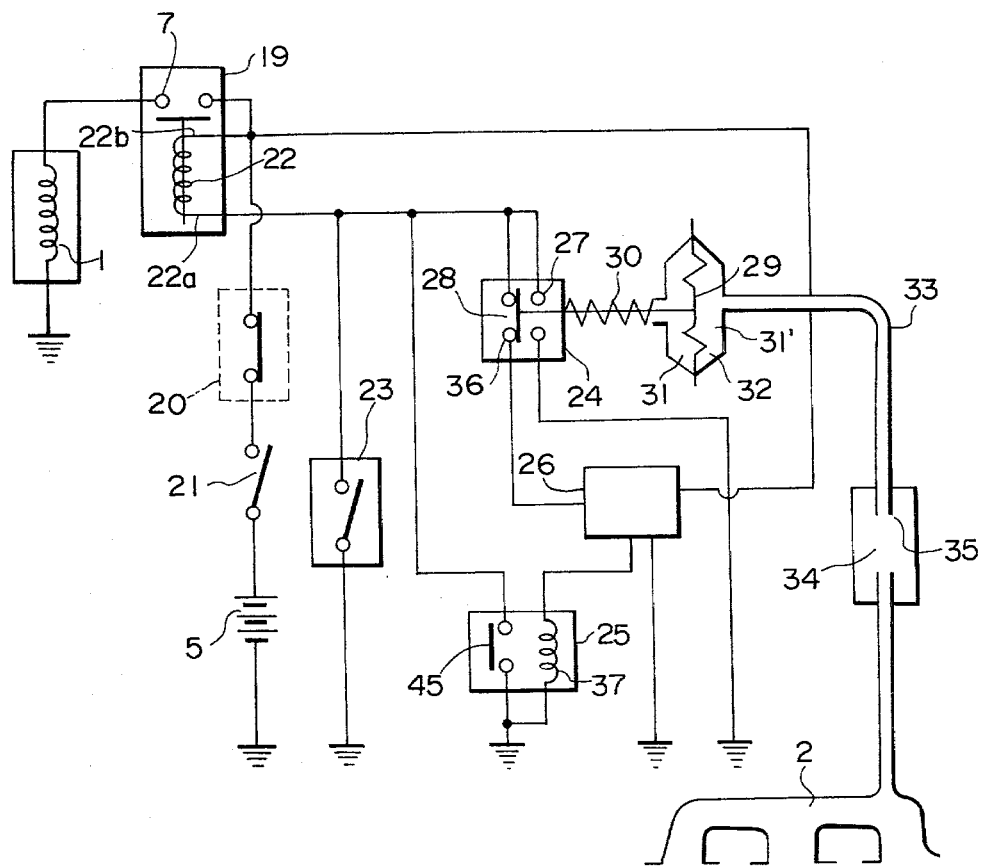
FIG. 2 is a schematic wiring diagram showing a first embodiment of the automatic car-cooler clutch control apparatus of the present invention.
Figure 3:
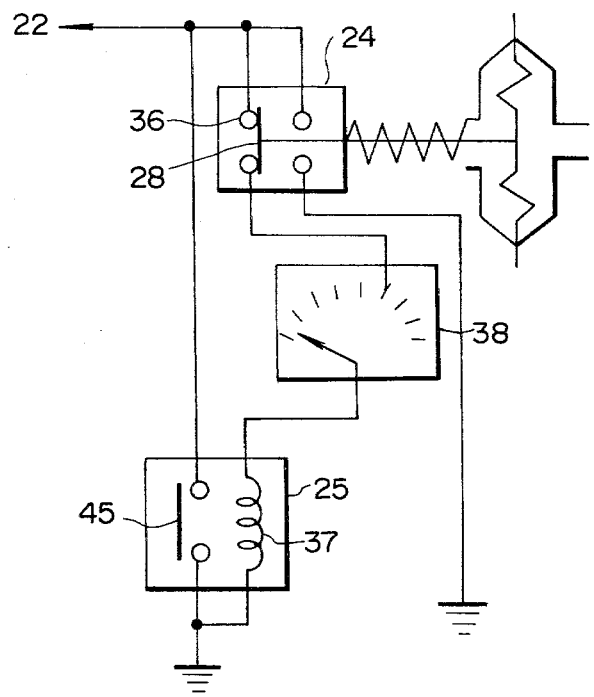
FIG. 3 is a partial schematic wiring diagram showing a second embodiment of the present invention.
Figure 4:
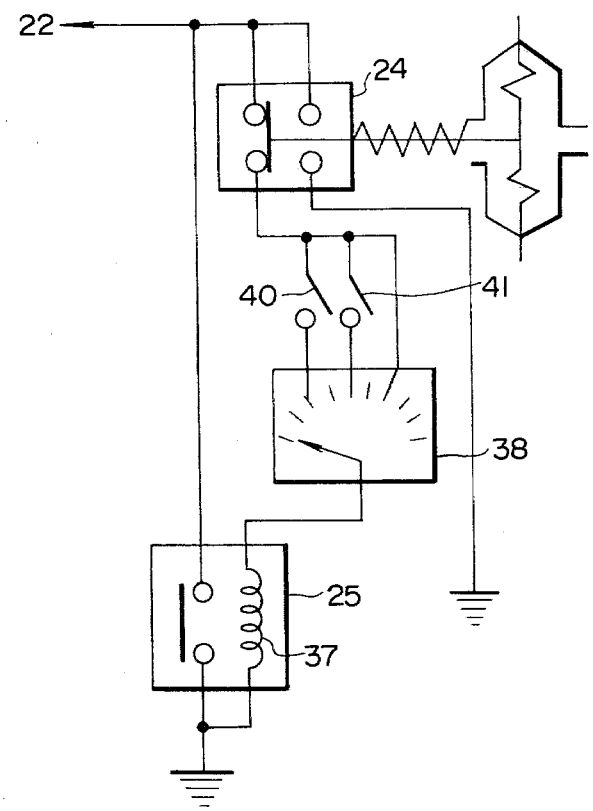
FIG. 4 is another partial schematic wiring diagram showing a third embodiment of the present invention.

In view of the above description, reference is now made to FIGS. 2 to 4, and more specifically to FIG. 2, wherein an embodiment of the automatic car-cooler clutch control apparatus of the present invention is illustrated.

In FIG. 2, the reference numeral 1 denotes an electromagnetic clutch coil to engage the car-cooler compressor with the engine. The coil is connected to a battery 5 through a pair of fixed contacts 7 of a clutch relay 19, a control switch 20, and a manual switch 21.

To one 22a of the terminals of the coil 22 of the clutch relay 19, there are connected in parallel a temperature switch 23 automatically turned on or off by changes in temperature within the passenger compartment, a vacuum switch 24 turned on or off by the vacuum pressure within the intake manifold 2, and a relay 25; the other 22b of the terminals of the coil 22 is connected to one contact point of the control switch 20 and a switching means such as a timer controlled switch 26 for supplying a source voltage thereto. The vacuum pressure switch 24 includes two pairs of fixed contact points 27 and 36, and a movable contact 28. The movable contact 28 is directly connected to a diaphragm 29 fixed within the vacuum pressure switch 32 and is normally brought into contact with the contact points 36 by the force of a spring 30. The diaphragm 29 divides the vacuum chamber into a compartment 31 on the left side at atmospheric pressure and another compartment 31' on the right side into which the vacuum pressure within the intake manifold 2 of the engine is introduced through a pipe 33 connected therebetween. In this embodiment, a vacuum pressure damper 34 having an orifice 35 therein is provided therebetween for damping the amplitude of vacuum pressure vibration. One of the pair of contact points 27 is connected to the clutch relay coil 22 and the other contact is connected to the ground, so that the clutch relay 19 is energized by the battery 5 when a vacuum pressure within the intake manifold 2 comes above a predetermined value and the movable contact 28 is brought into contact with the contact points 27.

Similarly, one of the pair of contact points 36 is connected to the clutch relay coil 22 and the other contact is grounded through a timer controlled switch 26 and a relay coil 37 of a relay 25, so that the clutch relay coil 22 is energized when the timer controlled switch 26 is operated to actuate the relay 25 to close the switch 45 of the relay 25. In this embodiment, the vacuum pressure switch 24 is so designed that the movable contact 28 is brought into contact with the fixed contact points 27 to energize the clutch relay coil 22 when the vacuum pressure within the intake manifold 2 is greater than some value such as 200 mmHg in vacuum pressure (less than 200 mmHg in gage pressure), that is, when there is no heavy loading on the engine such as when it is idling, accelerating, running at high speed, or climbing.

Next, the operation of the circuit of FIG. 2 is described according to various engine operating conditions. When a light load is applied to the engine, the vacuum pressure within the intake manifold 2 rises to 200 mmHg or more, and the vacuum switch 24 is operated in such a way that the movable contact point 28 is forced against the fixed contact points 27, and a current is passed through the coil 22 of the clutch relay 19. Consequently, the clutch relay 19 is actuated to pass a current through the electromagnetic clutch coil 1 to engage the car-cooler compressor with the engine. When a heavy load is applied to the engine under the above-mentioned condition, for example when the vehicle is accelerating, going up a slope, or running at high speed, as the vacuum pressure within the intake manifold 2 falls below 200 mmHg, the fixed contact points 27 of the vacuum switch 24 are opened by the action of the spring 30, the current does not flow through the coil 22 of the clutch relay 19, and the clutch relay 19 is deenergized to disengage the compressor clutch. At the same time, since the movable contact point 28 is brought into contact with the fixed contact points 36, a current is passed through the timer 26 and thereafter another current is passed through the coil 37 of the relay 25 after a predetermined period of time between 20 sec to 2 min) to actuate the relay 25 closing the switch 45. Consequently, the clutch relay 19 is energized again to pass a current through the electromagnetic clutch coil 1 and car-cooler compressor is engaged.

The temperature switch 23 is always kept closed if the temperature within the passenger compartment is above a predetermined value, therefore, the coil 22 of the clutch relay 19 is energized to operate the compressor, regardless of the engine operating conditions such as acceleration, high-speed running, or climbing. As a result, the passenger compartment can be cooled rapidly by the operation of the compressor whenever the temperature is above a predetermined value. In addition, the control switch 20 is so designed as to be automatically closed when the temperature within the passenger compartment rises above a predetermined value (e.g. 15° C.) to permit the clutch coil 1 to be ready to control the compressor clutch according to the signal from the clutch control apparatus of the present invention, when the manual switch 21 is turned on by the driver or passengers.

FIG. 3 shows a second embodiment of the present invention, in which a speed indicator 38 is connected between one of the fixed contact points 36 in the vacuum pressure switch 24 and the coil 37 in the relay 25. Therefore, when the vehicle speed reaches, for example, 100 Km/h, a mechanical switch or a lead switch within the speed indicator 38 is closed to permit a current to flow through the coil 37 in the relay 25, thereby the fixed contact switch 45 being closed to energize the clutch relay coil 22. A tachometer could be provided in place of the speed indicator 38, to provide a similar kind of switch as described hereinbefore.

In this embodiment, the cooler can be operated even when the vehicle goes up a slope, since the signal to actuate the coil 37 is produced when the vehicle speed reaches a predetermined value, regardless of the shift positions of the transmission.

FIG. 4 shows a third embodiment of the present invention, in which a second and third transmission position switches 40 and 41 are additionally provided in the speed indicator 38. In this embodiment, if the vehicle speed reaches a speed corresponding to the second or third transmission shift position, a current is passed through the coil 37 of the relay 25 to energize the clutch relay 19, thus operating the compressor.

As described hereinabove, the automatic car-cooler clutch control apparatus according to the present invention can control the compressor in such a way that although the clutch is automatically engaged or disengaged by the vacuum present within the intake manifold, that is, due to operating conditions such as acceleration, high-speed running, or climbing, it is additionally possible to operate the compressor after a predetermined period of time or when the vehicle reaches or exceeds a predetermined speed even if the vehicle is running at a high speed or going up a slope. In addition, it is also possible to operate the compressor manually if the temperature within the passenger compartment is high and a quick cooling is required as, for example, when the vehicle is left in the sun.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. An automatic car-cooler clutch control apparatus for an automobile having a passenger compartment, an engine with an intake manifold, and a cooler having a cooler compressor, said apparatus comprising:
   (1) a clutch coil for engaging/disengaging said car-cooler compressor with the engine;
   (2) a clutch relay connected to said clutch coil for energizing said clutch coil;
   (3) a vacuum pressure switch for energizing said clutch relay, said switch including:
      (a) a movable contact;
      (b) a first pair of fixed contact points; and
      (c) a second pair of fixed contact points, one terminal of each pair of said fixed contact points being connected to said clutch relay;
   (4) a vacuum chamber including:
      (a) a diaphragm disposed therein so as to provide two separate compartments, one being communicated with the atmosphere and the other being communicated with said intake manifold, said diaphragm being directly connected to said movable contact; and
      (b) a spring for urging said movable contact toward said first pair of fixed contact points when a vacuum pressure within the intake manifold is less than a predetermined value, said movable contact being brought into contact with the second pair of fixed contact points against the action of said spring when the vacuum pressure is more than the predetermined value; and
   (5) a temperature switch connected in parallel with said vacuum pressure switch, said temperature switch being operatively connected to said passenger compartment and said clutch relay for energizing said clutch relay when the temperature within the passenger compartment rises above a predetermined value, regardless of the state of said vacuum pressure switch.

* * * * *